UNITED STATES PATENT OFFICE.

HARRY C. TRENAMAN, OF HAMILTON, ONTARIO, CANADA.

COMPOSITION FOR WATERPROOFING LEATHER ARTICLES.

1,269,658.  Specification of Letters Patent.  Patented June 18, 1918.

No Drawing.  Application filed December 20, 1917.  Serial No. 208,112.

*To all whom it may concern:*

Be it known that I, HARRY C. TRENAMAN, a subject of the King of Great Britain, residing at Hamilton, in the county of Wentworth, Province of Ontario, and Dominion of Canada, have invented certain new and useful Improvements in Composition for Waterproofing Leather Articles; and I do hereby declare the following to be a full, clear, and exact description of the invention, such as will enable others skilled in the art to which it appertains to make and use the same.

My invention relates to a new and useful composition for water-proofing boots and shoes and other articles of leather in order to render the same impervious to the weather and more especially to snow, wet and damp weather.

One of the objects of my invention is to provide a preparation that will efficiently prevent water or moisture from entering the pores of the leather and from passing through the same to thereby eliminate the possibility of the leather becoming hard from exposure to dampness.

Another object is to provide a composition of this nature which will adapt the leather to receive a coat of ordinary shoe polish after the composition has been applied to the leather.

Another object of my invention is to provide a composition of this nature which will effectively cause the leather to last longer and to endure more than in the ordinary case.

The composition of matters constituting my invention consists of the following ingredients, combined substantially in the proportions stated, viz:

| | |
|---|---|
| Grease (preferably the product of petroleum, mineral oil or rock oil) | 25 per cent. |
| Gum (plain, raw or pine) | 5 per cent. |
| Wax (beeswax, carnauba wax, or vegetable wax) | 30 per cent. |
| Oil (preferably animal and mineral oil) | 35 per cent. |
| Rubber | 5 per cent. |

The operation of manufacturing my composition is as follows:

The grease, the gum and the wax are first amalgamated by heating the same together to a temperature of about 212 degrees Fahrenheit, and to this body the oil is then added, which reduces the temperature of the whole to about 125 degrees Fahrenheit, and to this mixture the rubber is then added, and subsequently the composition is then allowed to cool, whereby the composition will become a consistent mass in the form of a paste.

For general purposes, I preferably employ the ingredients named and in substantially the proportions stated and combine the same in the manner set forth, but for other purposes I may vary the proportions of the ingredients, and I may also combine any of the subclassed ingredients named under the general ingredients in substantially the proportions stated, so as to provide a composition to meet the requirements of the varying characters of the leather and the like to which the composition is to be applied.

In using the preparation, the leather to which it is to be applied should first be thoroughly cleansed, and thereafter the composition is rubbed well into the pores of the leather, thereby rendering the leather impervious to moisture, and after the composition has been thus applied, the leather may be coated with ordinary shoe polish.

Having thus described my invention, what I claim as new is:—

1. A composition comprising grease, gum, wax, oil, and rubber, substantially in the proportions stated.

2. A composition comprising grease 25 per cent., gum 5 per cent., wax 30 per cent., oil 35 per cent., and rubber 5 per cent.

In testimony whereof I have signed my name to this specification in the presence of two subscribing witnesses.

HARRY C. TRENAMAN.

Witnesses:
S. W. COCKRELL,
J. H. REID.